United States Patent
Fujisaki et al.

(10) Patent No.: US 11,532,825 B2
(45) Date of Patent: Dec. 20, 2022

(54) FUEL CELL

(71) Applicant: NGK INSULATORS, LTD., Nagoya (JP)

(72) Inventors: Shinji Fujisaki, Kuwana (JP); Noriyuki Ogasawara, Nagoya (JP); Makoto Ohmori, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 761 days.

(21) Appl. No.: 15/287,819

(22) Filed: Oct. 7, 2016

(65) Prior Publication Data

US 2017/0025684 A1 Jan. 26, 2017

Related U.S. Application Data

(63) Continuation of application No. PCT/JP2016/067043, filed on Jun. 8, 2016.

(30) Foreign Application Priority Data

Jul. 1, 2015 (JP) .............................. JP2015-132735

(51) Int. Cl.
*H01M 4/86* (2006.01)
*H01M 4/90* (2006.01)
(Continued)

(52) U.S. Cl.
CPC ....... *H01M 4/9033* (2013.01); *H01M 4/8605* (2013.01); *H01M 4/8657* (2013.01);
(Continued)

(58) Field of Classification Search
CPC ............. H01M 4/9033; H01M 4/8605; H01M 4/8657; H01M 8/1253; H01M 2004/8689; H01M 2008/1293
(Continued)

(56) References Cited

U.S. PATENT DOCUMENTS

2007/0111069 A1* 5/2007 Rehg ............... C04B 37/005 429/465
2013/0095410 A1 4/2013 Ohmori et al.
(Continued)

FOREIGN PATENT DOCUMENTS

JP 2006-32132 A 2/2006
JP 5522870 B1 * 6/2014 ............. C04B 35/00
(Continued)

OTHER PUBLICATIONS

English Translation of JP2014129185.*
(Continued)

*Primary Examiner* — Kiran Quraishi Akhtar
(74) *Attorney, Agent, or Firm* — Global IP Counselors, LLP

(57) ABSTRACT

A fuel cell comprises an anode, a cathode, and a solid electrolyte layer disposed between the anode and the cathode. The cathode includes a main phase configured by a perovskite oxide including at least one of La or Sr at the A site and that is expressed by the general formula $ABO_3$, and a secondary phase configured by strontium oxide. The occupied surface area ratio of the secondary phase in a cross section of the cathode is greater than or equal to 0.05% and less than or equal to 3%.

2 Claims, 3 Drawing Sheets

(51) Int. Cl.
*H01M 8/1253* (2016.01)
*H01M 8/12* (2016.01)

(52) U.S. Cl.
CPC .. *H01M 8/1253* (2013.01); *H01M 2004/8689* (2013.01); *H01M 2008/1293* (2013.01)

(58) Field of Classification Search
USPC ....................................................... 429/489
See application file for complete search history.

(56) References Cited

U.S. PATENT DOCUMENTS

2015/0024302 A1  1/2015  Kobayashi et al.
2015/0349349 A1  12/2015  Ohmori et al.

FOREIGN PATENT DOCUMENTS

| JP | 2014-129185 | A | 7/2014 | | |
|---|---|---|---|---|---|
| JP | 2014129185 | * | 7/2014 | ........... | C04B 35/622 |
| JP | 2015-38856 | A | 2/2015 | | |
| WO | 2013/054631 | A1 | 4/2013 | | |
| WO | 2014/168071 | A1 | 10/2014 | | |

OTHER PUBLICATIONS

Translation of International Search Report dated Jul. 12, 2016 for the corresponding International Application No. PCT/JP2016/067043.

International Search Report dated Jul. 12, 2016 for the corresponding International Application No. PCT/JP2016/067043.

An English Translation of the Written Opinion of the International Search Authority for the corresponding international application No. PCT/JP2016/067043, dated Jul. 12, 2016.

An English Translation of the International Preliminary Report on Patentability for the corresponding international application No. PCT/JP2016/067043, dated Jan. 2, 2018.

* cited by examiner

FUEL CELL

TECHNICAL FIELD

The present invention relates to a fuel cell.

BACKGROUND ART

A typical fuel cell is known to include an anode, a cathode, and a solid electrolyte layer disposed between the anode and the cathode.

The material used in the cathode is suitably a perovskite oxide including at least one of La or Sr at the A site and that is expressed by the general formula $ABO_3$. (For example, reference is made to Japanese Patent Application Laid-Open No. 2006-32132).

Technical Problem

However, the fuel cell output may be reduced by repetitive power generation. The present inventors have gained the new insight that one cause of a reduction in output results from deterioration of the cathode, and that such deterioration of the cathode is related to the proportion of strontium oxide that is present therein.

The present invention is proposed based on the new insight above, and has the object of providing a fuel cell that inhibits a reduction in output.

Solution to Problem

The fuel cell according to the present invention comprises an anode, a cathode, and a solid electrolyte layer disposed between the anode and the cathode. The cathode contains a main phase configured by a perovskite oxide including at least one of La or Sr at the A site and that is expressed by the general formula $ABO_3$, and a secondary phase that is configured by strontium oxide. An occupied surface area ratio of the secondary phase in a cross section of the cathode is greater than or equal to 0.05% and less than or equal to 3%.

Advantageous Effects of Invention

The present invention provides a fuel cell that inhibits a reduction in output.

DESCRIPTION OF EMBODIMENTS

Figure 1:
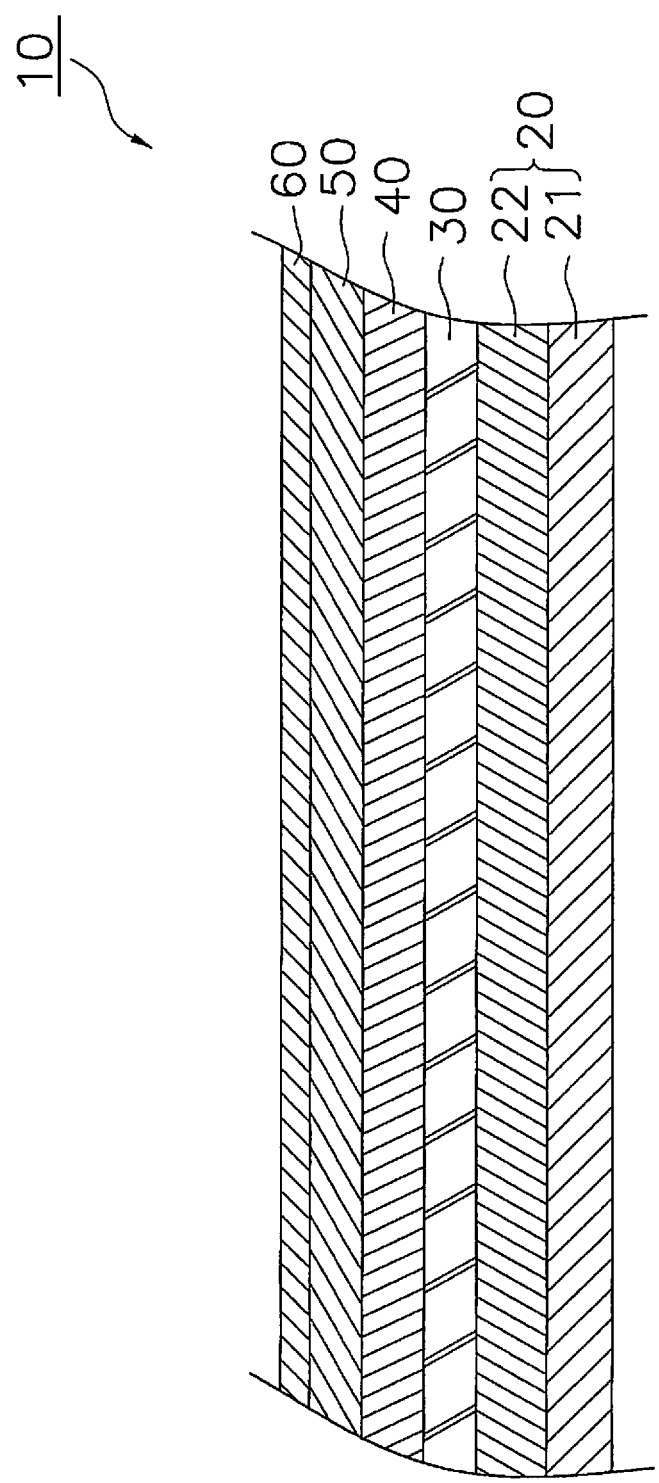
FIG. 1 is a cross sectional view illustrating a configuration of a fuel cell.

An embodiment of the present invention will be described below making reference to the figures. Those aspects of configuration in the following description of the figures that are the same or similar are denoted by the same or similar reference numerals. However, the figures are merely illustrative, and the actual ratios or the like of the respective dimensions may differ.

Configuration of Fuel Cell 10

The configuration of the fuel cell 10 will be described making reference to the drawings. The fuel cell 10 is configured as a so-called solid oxide fuel cell (SOFC). The possible configurations of the fuel cell 10 include a flat-tubular type, a segmented-in-series type, an anode-supporting type, an electrolyte flat-plate type, or a cylindrical type, or the like.

FIG. 1 is a cross sectional view illustrating a configuration of a fuel cell 10. The fuel cell 10 includes an anode 20, a solid electrolyte layer 30, a barrier layer 40, a cathode 50 and a current collecting layer 60.

The anode 20 functions as the anode for the fuel cell 10. As illustrated in FIG. 1, the anode 20 includes anode current collecting layer 21 and an anode active layer 22.

The anode current collecting layer 21 is configured as a porous body that exhibits superior gas permeability. The constituent material configuring the anode current collecting layer 21 includes use of a material that is used in the anode current collecting layer of a conventional SOFC, and for example, includes NiO(nickel oxide)-8YSZ (8 mol % of yttria-stabilized zirconia), or NiO—$Y_2O_3$ (yttria). When NiO is included in the anode current collecting layer 21, at least a portion of the NiO may be reduced to Ni during operation of the fuel cell 10. The thickness of the anode current collecting layer 21 may be configured for example as 0.1 mm to 5.0 mm.

The anode active layer 22 is disposed on the anode current collecting layer 21. The anode active layer 22 is configured as a porous body that is denser than the anode current collecting layer 21. The constituent material for the anode active layer 22 includes use of a material used in an anode active layer of a conventional SOFC, and for example, includes NiO-8YSZ. When NiO is included in the anode active layer 22, at least a portion of the NiO may be reduced to Ni during operation of the fuel cell 10. The thickness of the anode active layer 22 may be configured for example as 5.0 micrometers to 30 micrometers.

The solid electrolyte layer 30 is disposed between the anode 20 and the cathode 50. The solid electrolyte layer 30 in the present embodiment is sandwiched between the anode 20 and the barrier layer 40. The solid electrolyte layer 30 functions to enable permeation of oxygen ions that are produced by the cathode 50. The solid electrolyte layer 30 is configured by a material that is more dense that the anode 20 or the cathode 50.

The solid electrolyte layer 30 may contain $ZrO_2$ (zirconia) as a main component. In addition to zirconia, the solid electrolyte layer 30 may contain an additive such as $Y_2O_3$ (yttria) and/or $Sc_2O_3$ (scandium oxide). These additives function as a stabilizing agent. The mol composition ratio (stabilizing agent: zirconia) of the stabilizing agent to zirconia in the solid electrolyte layer 30 may be configured to approximately 3:97~20:80. Therefore the material used in the solid electrolyte layer 30 includes 3YSZ, 8YSZ, and 10YSZ, or ScSZ (zirconia stabilized with scandia), or the like. The thickness of the solid electrolyte layer 30 for example may be configured as 3 micrometers to 30 micrometers.

In the present embodiment, the term composition X "contains as a principal component" composition Y means that composition Y preferably occupies at least 70 wt % of the total of composition X, and more preferably occupies at least 90 wt %.

The barrier layer 40 is disposed between the solid electrolyte layer 30 and the cathode 50. The barrier layer 40 inhibits formation of a high resistivity layer between the solid electrolyte layer 30 and the cathode 50. The barrier layer 40 is configured by a material that is more dense that the anode 20 or the cathode 50. The barrier layer 40 may include a principal component of a ceria based material such as GDC (gadolinium-doped ceria), SDC (samarium-doped ceria), or the like. The thickness of the barrier layer 40 may be configured for example as 3 micrometers to 20 micrometers.

The cathode 50 is disposed on the barrier layer 40. The cathode 50 functions as a cathode for the fuel cell 10. The cathode 50 is configured as a porous body.

The cathode 50 contains a main component configured by a perovskite oxide including at least one of La or Sr at the A site and that is expressed by the general formula $ABO_3$. This type of perovskite oxide includes (La, Sr) (Co, Fe)$O_3$: (lanthanum strontium cobalt ferrite), (La, Sr)Fe$O_3$: (lanthanum strontium ferrite), (La, Sr)Co$O_3$: (lanthanum strontium cobaltite), La(Ni, Fe)$O_3$: (lanthanum nickel ferrite), (La, Sr)Mn$O_3$: (lanthanum strontium manganate), or the like. However there is no limitation in this regard.

The cathode 50 contains strontium oxide (SrO) as a secondary component. SrO includes a cubic sodium chloride crystal structure.

Although there is no limitation in relation to the occupied surface area ratio of the main phase configured by a main component being a perovskite oxide, it may be configured as greater than or equal to 91% and less than or equal to 99.95%. The occupied surface area ratio of the secondary phase configured by SrO in the cross section of the cathode 50 is greater than or equal to 0.05% and less than or equal to 3%. Since the inactive portion in the cathode inner portion is reduced by a configuration of the occupied surface area ratio of the secondary phase to less than or equal to 3%, it is possible to inhibit the progression of deterioration of the cathode during electrical conduction resulting from a reaction between the secondary phase and the main phase. Furthermore, since the backbone of the porous structure can be strengthened and sintering characteristics of the cathode 50 can be enhanced by a configuration of the occupied surface area ratio of the secondary phase to greater than or equal to 0.05%, it is possible to inhibit microscopic structural changes to the cathode 50 during electrical conduction. Consequently, it is possible to enhance the durability of the cathode 50.

In the present embodiment, the feature of "occupied surface area ratio of substance Z in a cross section" means the proportion in the total surface area of substance Z relative to the total surface area including the pores and the solid phase. The method of calculating the occupied surface area ratio will be described below.

The average equivalent circle diameter of the secondary phase in the cross section of the cathode 50 is preferably greater than or equal to 10 nm and less than or equal to 500 nm. A further reduction to the deterioration rate of the cathode 50 is enabled in this manner. The equivalent circle diameter is the diameter of a circle that has the same surface area as the secondary phase in an analysis image that is analyzed using a field emission scanning electron microscope (FE-SEM) as described below. The average equivalent circle diameter is the value of the arithmetic average of greater than or equal to 20 equivalent circle diameters for the secondary phase. The greater than or equal to 20 secondary phases that are the object of equivalent circle diameter measurement are preferably selected in an arbitrary manner from five or more positions on an FE-SEM image.

In addition to the main phase and the secondary phase, the cathode 50 may include a third phase configured by a perovskite oxide that is expressed by the general formula $ABO_3$ and that is different from the main phase, and by an oxide of the constituent elements of the main phase, or the like. The oxide of the constituent elements of the main phase include for example (Co, Fe)$_3O_4$, and $Co_3O_4$ or the like. (Co, Fe)$_3O_4$ includes $Co_2FeO_4$, $Co_{1.5}Fe_{1.5}O_4$, and $CoFe_2O_4$, or the like.

The occupied surface area ratio of the third phase in the cross section of the cathode 50 may be configured to greater than or equal to 0.5% and less than or equal to 10%. In this manner, microcracks after thermal cycle testing as well as after firing can be inhibited. Thermal cycle testing refers to testing that includes 10 repetitions of a cycle of maintaining a reducing atmosphere by supplying Ar gas and hydrogen gas (4% relative to Ar) to the anode, and increasing the temperature from ambient temperature to 800 degrees C. over 2 hours followed by reducing the temperature to ambient temperature over 4 hours.

The current collecting layer 60 is disposed on the cathode 50. The current collecting layer 60 may be configured by a perovskite composite oxide expressed by the composition formula (1) below. However there is no limitation in this regard. The material used in the current collecting layer 60 is preferably a material that exhibits a smaller electrical resistance than the material used in the cathode 50.

$$La_m(Ni_{1-x-y}Fe_xCu_y)_nO_{3-\delta} \qquad (1)$$

A substance other than La may be contained in the A site of composition formula (1), and a substance other than Ni, Fe or Cu may be contained in the B site. In composition formula (1), m and n are greater than or equal to 0.95 and less than or equal to 1.05, x (Fe) is greater than or equal to 0.03 and less than or equal to 0.3, y (Cu) is greater than or equal to 0.05 and less than or equal to 0.5, and $\delta$ is greater than or equal to 0 and less than or equal to 0.8.

Method of Calculation of Occupied Surface Area in Cathode Cross Section

The method of calculation of the occupied surface area ratio in a cross section of the cathode will be described making reference to the figures. In the following description, although a method of calculation of the occupied surface area ratio of the secondary phase will be described, the occupied surface area ratio of the main phase or the third phase may be calculated in the same manner.

(1) Backscattered Electron Image

Figure 2:
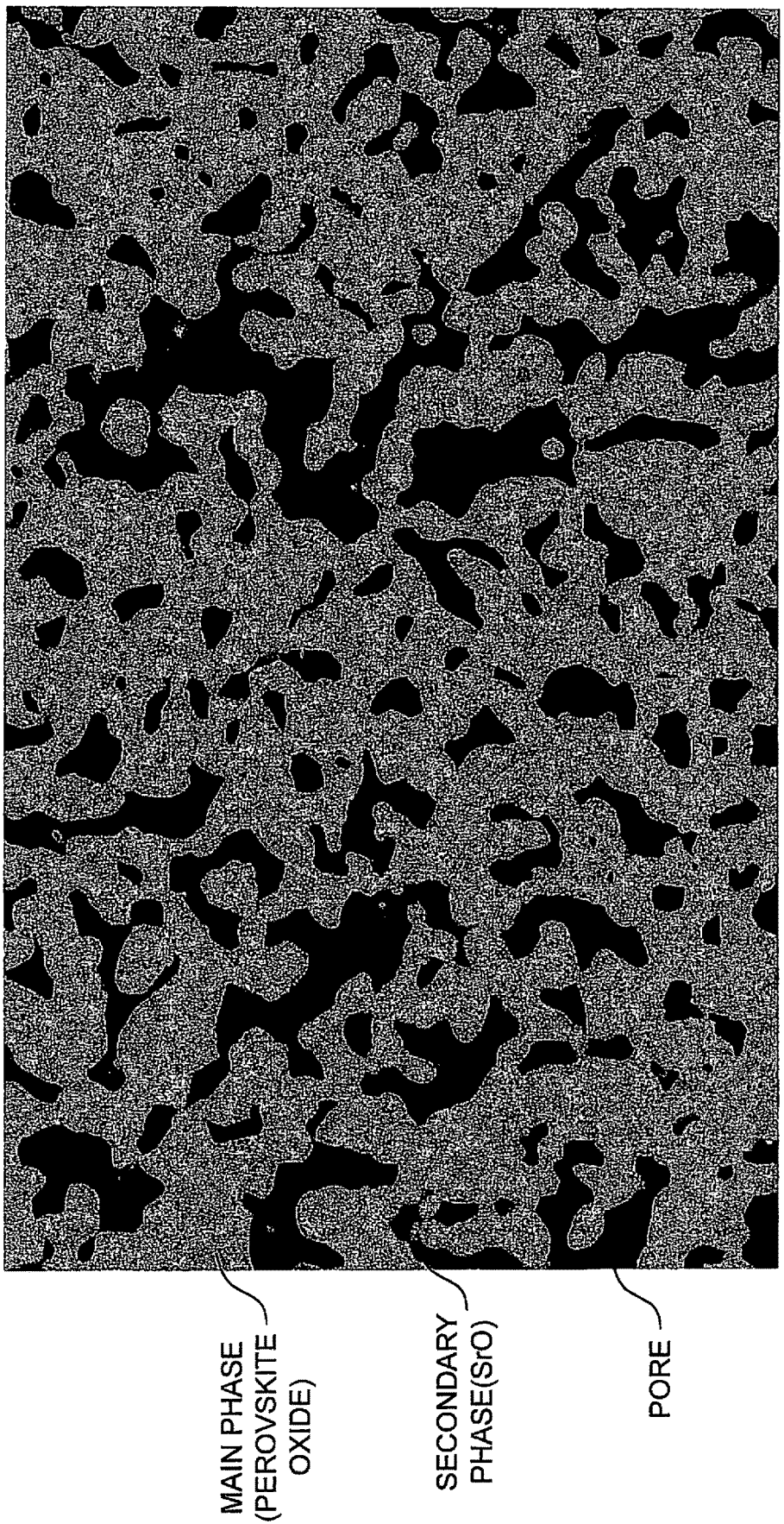
FIG. 2 is a backscattered electron image of a cross section of the cathode.

FIG. 2 illustrates an example of a backscattered electron image of a cross section of the cathode 50 enlarged with a magnification of 10,000 times by FE-SEM using a backscattered electron detector. FIG. 2 illustrates a cross section of the cathode 50 that contains (La, Sr)(Co, Fe)$O_3$ as a main component. The cross section of the cathode 50 is preprocessed with polishing with precision machinery followed by an ion milling process. The backscattered electron image in FIG. 2 is obtained by an FE-SEM (model: ULTRA55; acceleration voltage of 1 kV; working distance: 2 mm) manufactured by Zeiss AG (Germany).

In FIG. 2, the contrast of the main phase ((La, Sr)(Co, Fe)$O_3$) differs from that of the secondary phase (SrO), and the main phase is displayed as "faint gray", the secondary phase as "gray" and the pores as "black". In this manner, the main phase, secondary phase and third phase can be identified from the contrast of the backscattered electron image.

(2) Analysis of Backscattered Electron Image

Figure 3:
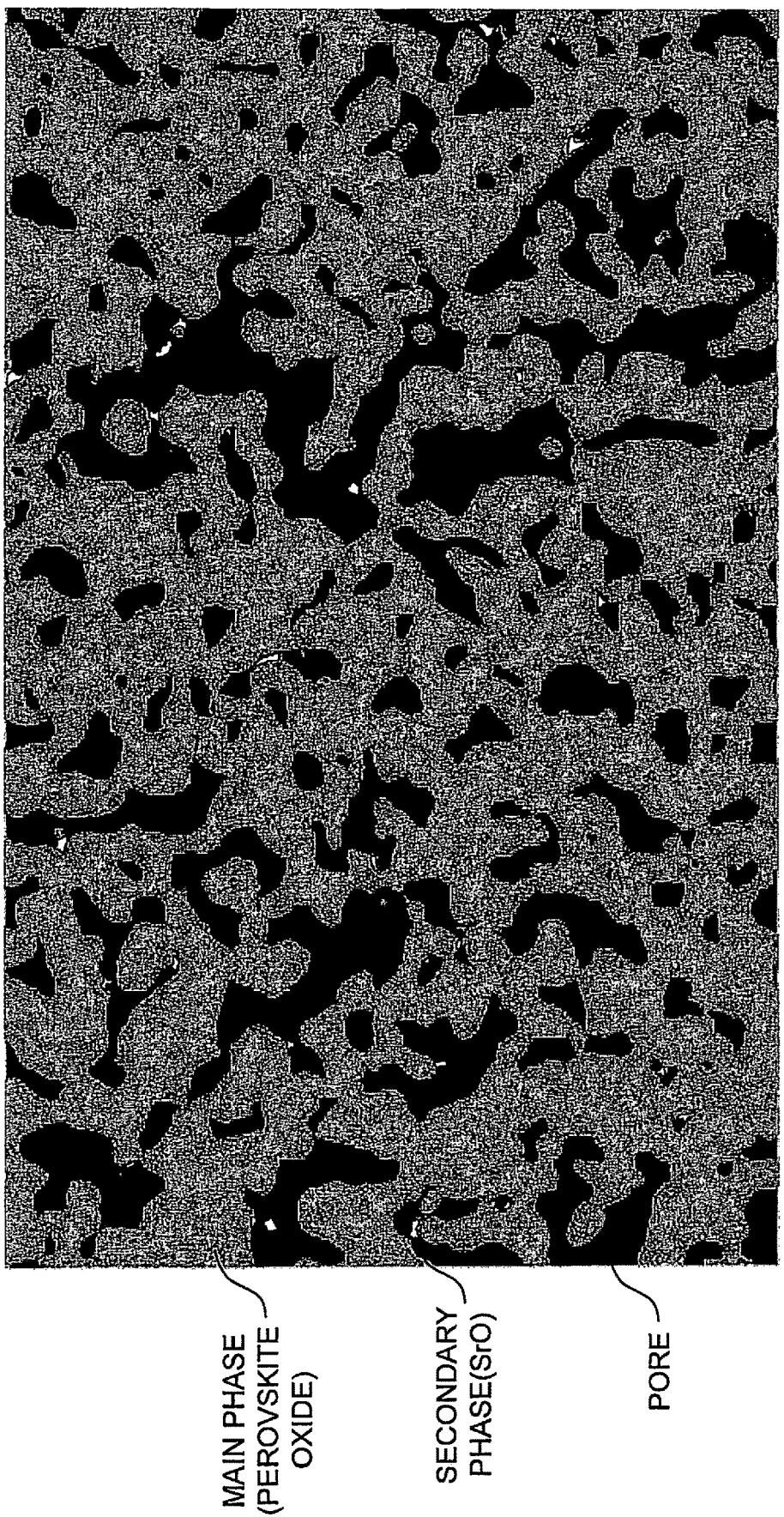
FIG. 3 illustrates image analysis results in relation to FIG. 2.

FIG. 3 illustrates image analysis results using HALCON image analysis software produced by MVTec GmbH (Germany) in relation to the backscattered electron image illustrated in FIG. 2. In FIG. 3, the secondary phase is represented as the white area enclosed by a black solid line.

(3) Calculation of Occupied Surface Area

The total surface area of the secondary phase in the white areas is calculated with reference to the analysis image in FIG. 3. Next, the proportion of the total surface area of the secondary phase relative to the surface area (including the pores and the solid phase) in the total backscattered electron image is calculated. The proportion of the total surface area of the secondary phase calculated in this manner is taken to be the occupied surface area ratio of the secondary phase in the cathode 50.

Cathode Material

The cathode material used to configure the cathode 50 is a mixture including a main phase configured by a perovskite oxide and a secondary phase of SrO. SrO may be configured as a mixture of strontium carbonate, strontium hydroxide, and strontium nitrate.

The occupied surface ratio of the secondary phase in the cathode 50 may be adjusted by adjusting the added amount of material powder containing SrO.

Adjusting the particle size of the material powder containing SrO enables an adjustment of the average equivalent circle diameter of the secondary phase in the cathode 50. An accurate classification that includes an upper limiting value and a lower limiting value of the particle diameter is possible by use of an air classifier to adjust the grain size of the material powder containing SrO. When the particle size of the material powder containing SrO has a coarse configuration, the average equivalent circle diameter of the secondary phase can be configured to be large, and when the particle size is fine, the average equivalent circle diameter of the secondary phase can be configured to be small. Furthermore, when the particle size distribution of the material powder containing SrO is large, the average equivalent circle diameter of the secondary phase can be configured to be large, and when the particle size distribution is small, the average equivalent circle diameter of the secondary phase can be configured to be small.

Method of Manufacturing Fuel Cell 10

Next, an example will be described of a manufacture method for the fuel cell 10.

Firstly, a green body for the anode current collecting layer 21 is formed by molding an anode current collecting layer material powder using a die press molding method.

Then, a slurry for the anode active layer is formed by adding PVA (polyvinyl alcohol) as a binder to a mixture of a pore forming agent (for example, PMMA) and the anode active layer material powder. The slurry for the anode active layer is printed onto the green body of the anode current collecting layer 21 using a printing method or the like to thereby form a green body for the anode active layer 22. The green body for the anode 20 is formed as described above.

Next, a slurry for the solid electrolyte layer is prepared by mixing terpineol and a binder with a solid electrolyte layer material powder. The slurry for the solid electrolyte layer is coated onto the green body of the anode active layer 22 using a printing method or the like to thereby form a green body for the solid electrolyte layer 30.

Next, a slurry for the barrier layer is prepared by mixing terpineol and a binder with a barrier layer material powder. The slurry for the barrier layer is coated onto the green body of an solid electrolyte layer 30 using a printing method or the like to thereby form a green body for the barrier layer 40.

Next, the green bodies respectively for the anode 20, the solid electrolyte layer 30 and the barrier layer 40 are fired (1350 to 1450 degrees C., 1 to 20 hours) to form the anode 20, the solid electrolyte layer 30 and the barrier layer 40.

Then, the material for the cathode 50 as described above (mixture of the perovskite oxide material as the main component and SrO as the secondary component), water and a binder are mixed in a ball mill for 24 hours to prepare a cathode slurry. At that time, the occupied surface area ratio of the secondary phase in the cathode 50 after firing can be controlled by adjusting the mixed amount of SrO into the cathode material.

Then the cathode slurry is coated onto the barrier layer 40 using a printing method or the like to thereby form a green body for the cathode 50.

Then the material for the current collecting layer 60 as described above, water and a binder are mixed to prepare a slurry for the current collecting layer.

Then the slurry for the current collecting layer is coated onto the green body for the cathode 50 to thereby form a green body for the current collecting layer 60.

Next, the green body for the cathode 50 and the current collecting layer 60 are fired (1000 to 1100 degrees C., 1 to 10 hours) to form the cathode 50 and the current collecting layer 60.

Other Embodiments

The present invention is not limited to the above embodiment, and various changes or modifications may be added within a scope that does not depart from the scope of the invention.

In the above embodiment, although the fuel cell 10 includes the current collecting layer 60, the current collecting layer 60 may be omitted.

Although the fuel cell 10 includes the barrier layer 40, the barrier layer 40 may be omitted. In this configuration, the cathode 50 is disposed on the solid electrolyte layer 30.

Although the barrier layer 40 is configured with a monolayer configuration, a laminated structure may be provided in which a dense barrier layer is laminated (randomly) with a porous barrier layer.

EXAMPLES

Although the examples of a fuel cell according to the present invention will be described below, the present invention is not thereby limited to the following examples.

Preparation of Samples No. 1 to No. 12

A fuel cell according to Samples No. 1 to No. 12 is prepared as described below.

Firstly, a mixed powder is prepared by drying a slurry of a mixture of IPA and a compounding powder of a pore-forming agent (PMMA), $Y_2O_3$ powder and NiO powder in a nitrogen atmosphere.

Next, uniaxial pressing (compaction pressure 50 MPa) is applied to the mixed powder to form a plate of 30 mm length×30 mm width and a thickness of 3 mm. A green body for the anode current collecting layer is prepared by further consolidation of the plate by use of a CIP (compaction pressure: 100 MPa).

Next, the slurry formed from a mixture of IPA and a compounding powder of PMMA and NiO-8YSZ is coated onto the green body for the anode current collecting layer.

Next, a slurry for the solid electrolyte layer is prepared by mixing terpineol and a binder with 8YSZ. Then the slurry for the solid electrolyte layer is coated onto the green body of the anode to thereby form a green body for the solid electrolyte layer.

Then a GDC slurry is prepared, and the GDC slurry is coated onto the green body for the solid electrolyte layer to thereby prepare a green body for the barrier layer.

Next, the green bodies respectively for the anode, the solid electrolyte layer and the barrier layer are fired (1450 degrees C., 5 hours) to form the anode, the solid electrolyte layer and the barrier layer.

Next, a cathode material is prepared by adding a powder of a material containing SrO (secondary component of cathode) to the powder of a perovskite oxide material (a main component for the cathode) as shown in Table 1. At that time, the addition amount of SrO is adjusted in each sample so that the occupied surface area ratio of the secondary phase (SrO) in the cross section of the cathode takes the values shown in Table 1. Furthermore, the particle size of SrO is adjusted so that the average equivalent circle diameter of the secondary phase takes the values shown in Table 1.

Next, a slurry for the cathode is prepared by mixing terpineol and a binder with a cathode material. The slurry for the cathode is coated onto the green body for the barrier layer to thereby prepare a green body for the cathode.

The green body for the cathode is fired (1000 to 1100 degrees C., 1 hour) to form the cathode.

Measurement of Occupied Surface Area Ratio

After polishing of the cathode in each sample with precision machinery, ion milling processing is performed using an IM4000 manufactured by Hitachi High-Technologies Corporation.

A backscatter electron image of the cross section of the cathode enlarged with a magnification of 10,000 times by a FE-SEM using a backscatter electron detector is acquired. FIG. 2 is a backscatter electron image of the cathode cross section of Sample No. 5.

Then, an analysis image is acquired by analyzing the backscatter electron image for each sample using HALCON image analysis software produced by MVTec GmbH (reference is made to FIG. 3). The secondary phase configured by SrO is illustrated in FIG. 3 by the white areas.

Then, the occupied surface area ratio is calculated as the occupied surface area ratio of the secondary phase relative to the total surface area (including gas phase and solid phase) in the backscatter electron image. The calculation results for the occupied surface area ratio of the secondary phase are shown in Table 1.

Average Equivalent Circle Diameter of Secondary Phase

An analysis image of the backscatter electron image as described above is acquired at five positions in the cross section of the cathode of the cathode to thereby calculate the average equivalent circle diameter of the secondary phase at 20 positions that are arbitrarily selected from the five analysis images. The calculation results for the average equivalent circle diameter of the secondary phase are shown in Table 1.

Durability Testing

Sample No. 1 to No. 12 are heated to 750 degrees C. while supplying nitrogen gas to the anode side and air to the cathode side. When reaching a temperature of 750 degrees C., hydrogen gas is supplied to the anode to perform a reduction process for 3 hours.

Next, a voltage drop rate per 1000 hours is measured as a deterioration rate. The output density at a rated current density value of 0.2 A/cm$^2$ at a temperature of 750 degrees C. is used. The measurement results are summarized in Table 1. In this examples, a sample having a deterioration rate of less than or equal to 1.5% is evaluated as having a low deterioration state.

The presence or absence of cracks in the cathode inner portion is observed by electron microscope observation of a cross section of the cathode after durability testing. Table 1 denotes samples confirmed to have a crack of greater than or equal to 5 micrometers as "YES", and denotes samples confirmed to have a crack of less than 5 micrometers as "YES (insignificant)". The observation results are shown in Table 1.

TABLE 1

| Sample | Main Component of Cathode | Occupied Surface Area Ratio of Secondary Phase (SrO) (%) | Equivalent Circle Diameter of Secondary Phase (SrO) (nm) | Deterioration Rate (%) | Presence/Absence of Microcracks | Evaluation |
|---|---|---|---|---|---|---|
| 1 | (La,Sr)(Co,Fe)O$_3$ | 0.02 | 5 | 2.3 | YES | X |
| 2 | (La,Sr)FeO$_3$ | 0.03 | 3 | 1.9 | YES | X |
| 3 | (La,Sr)(Co,Fe)O$_3$ | 0.05 | 5 | 1.5 | YES (INSIGNIFICANT) | ○ |
| 4 | (La,Sr)(Co,Fe)O$_3$ | 0.12 | 10 | 1.2 | NO | ◎ |
| 5 | (La,Sr)(Co,Fe)O$_3$ | 0.25 | 60 | 0.2 | NO | ◎ |
| 6 | (La,Sr)FeO$_3$ | 0.72 | 30 | 0.3 | NO | ◎ |
| 7 | (La,Sr)(Co,Fe)O$_3$ | 1.2 | 180 | 0.2 | NO | ◎ |
| 8 | (La,Sr)FeO$_3$ | 1.6 | 120 | 0.8 | NO | ◎ |
| 9 | (La,Sr)(Co,Fe)O$_3$ | 2.3 | 360 | 0.6 | NO | ◎ |
| 10 | (La,Sr)(Co,Fe)O$_3$ | 2.8 | 500 | 1.0 | NO | ◎ |
| 11 | (La,Sr)(Co,Fe)O$_3$ | 3.0 | 600 | 1.2 | YES (INSIGNIFICANT) | ○ |
| 12 | (La,Sr)(Co,Fe)O$_3$ | 3.5 | 580 | 2.0 | YES (INSIGNIFICANT) | X |

As shown in Table 1, samples in which the occupied surface area ratio of the secondary phase (SrO) in the cathode is greater than or equal to 0.05% and less than or equal to 3% exhibit a reduction in the deterioration rate of the cathode to less than or equal to 1.5%, and inhibit the formation of microcracks. This feature is due to that fact that deterioration of the cathode is inhibited by reducing the inactive portion of the cathode inner portion by configuring the occupied surface area ratio of the secondary phase to less than or equal to 3%, and strengthening the backbone of the porous structure as a result of improving the sintering characteristics of the cathode due to a configuration in which the occupied surface area ratio of the secondary phase to greater than or equal to 0.05%.

In samples in which the average equivalent circle diameter of the secondary phase as shown in Table 1 is greater than or equal to 10 nm and less than or equal to 500 nm, a further inhibition on the formation of microcracks in the inner portion of the cathode is enabled.

The invention claimed is:

1. A fuel cell comprising;

an anode, a cathode containing a solid phase including a main phase and a secondary phase within the cathode, the main phase consisting of a perovskite oxide including at least one of La or Sr at the A site, the main phase being expressed by the general formula $ABO_3$, and the secondary phase consisting of strontium oxide, and a solid electrolyte layer disposed between the anode and the cathode, an occupied surface area ratio of the main phase, relative to a total surface area of the solid phase and pores within the cross section of the cathode, being greater than or equal to 91% and less than or equal to 99.5%, an occupied surface area ratio of the strontium oxide, relative to the total surface area of the solid phase and pores within the cross section of the cathode, being greater than or equal to 0.05% and less than or equal to 3%, and an average equivalent circle diameter of the strontium oxide in the cross section of the cathode being greater than or equal to 10 nm and less than or equal to 500 nm.

2. The fuel cell according to claim 1, wherein the cathode comprises a third phase configured by at least one of $(Co, Fe)_3O_4$, $Co_3O_4$ and a second perovskite oxide expressed by the general formula $ABO_3$, constituent elements of the second perovskite oxide being different from constituent elements of the main phase.

* * * * *